No. 763,652. PATENTED JUNE 28, 1904.
J. A. ALLEN.
HOSE COUPLING.
APPLICATION FILED JUNE 12, 1903.
NO MODEL.

WITNESSES:
INVENTOR
James A. Allen
BY Frank Adams
ATTORNEY

No. 763,652. Patented June 28, 1904.

UNITED STATES PATENT OFFICE.

JAMES ALEXANDER ALLEN, OF SEATTLE, WASHINGTON.

HOSE-COUPLING.

SPECIFICATION forming part of Letters Patent No. 763,652, dated June 28, 1904.

Application filed June 12, 1903. Serial No. 161,213. (No model.)

*To all whom it may concern:*

Be it known that I, JAMES ALEXANDER ALLEN, a citizen of the United States of America, and a resident of the city of Seattle, county of King, and State of Washington, have invented certain new and useful Improvements in Hose-Couplings, of which the following is a specification.

My invention relates to improvements in hose-couplings, and has for its object the production of a simplified and inexpensive coupling of this nature which is durable in use, can be readily connected and disconnected, and insures a tight joint between the coupling parts.

The above-mentioned and other desirable objects are attained by the constructions, combinations, and arrangements of parts, as disclosed on the accompanying drawings, set forth in this specification, and succinctly pointed out in the appended claims.

Figure 2:
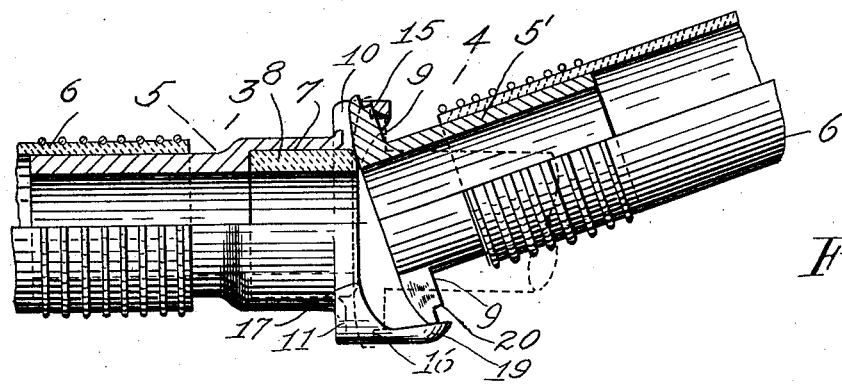
Figure 1:
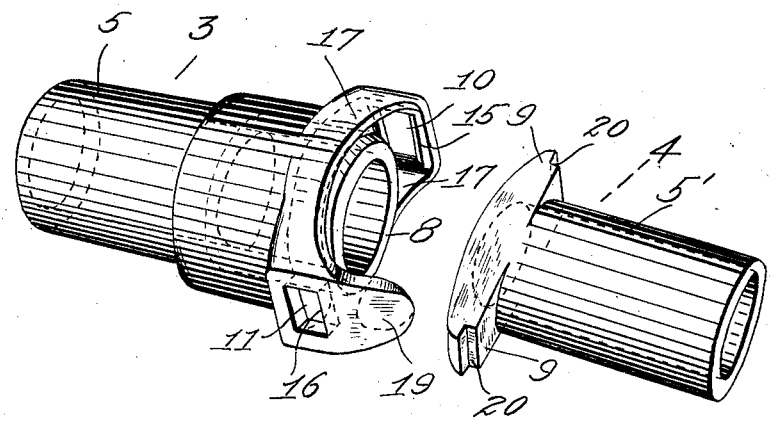

With reference to the drawings filed herewith and bearing like reference characters for corresponding parts throughout, Figure 1 is a view in perspective of my improved coupling, showing the parts disconnected; and Fig. 2 is a side view of the coupling with the part shown by bold lines in relative position for the final movement to close the connection and shows said parts in longitudinal half-section and indicates by broken lines the position of the parts when connected.

This invention includes a pair of tubular coupling parts 3 and 4, which are formed with suitable tubular stem portions, as 5 and 5', respectively, of the required size to fit within the ends of hose-sections, as 6, though one of these coupling parts can be formed integral with a faucet or may be formed with screw-threads on the stem portion for engagement with a pipe-nipple or the like without departing from the essence of the invention.

The coupling part 3 is enlarged in diameter at the head end and is formed with a comparatively deep annular recess or counterbore 7 in this end as the seat for a resilient packing-ring 8, which preferably comprises a section of thick rubber tubing whose internal diameter is substantially equal to the internal diameter of stem 5, and this packing-ring is of suitable length to project slightly beyond the outer end of the counterbore when seated therein, and serves to pack the joint between the head ends of the coupling parts and also yieldingly urge said parts to separate from each other when they are connected together, as will be understood from the following.

The connection proper between the coupling parts consists of opposite laterally-projecting lugs 9, secured to the head end of the coupling part 4, and preferably formed rectangular in cross-section to afford comparatively broad side surfaces, and opposite sockets or keepers 10 and 11, arranged transversely the head end of coupling part 3 at diametrically opposite points and formed of suitable size to receive freely the outer end portions of said lugs, and these sockets or keepers are formed with transverse shoulders, as 15 and 16, respectively, at the mouths, which are arranged at suitable separation from each other to stand across the rear side faces of the lugs 9 when they are in place in the sockets or keepers, and the coupling parts 3 and 4 stand substantially concentric with each other.

On the rear side face of each lug 9 is a rearwardly-projecting stop 20, which is suitably disposed relatively to the center of the coupling part to lie just within the shoulder in a respective socket or keeper when the coupling parts are connected, and thereby prevent lateral displacement of the parts relatively to each other. These stops are conveniently provided by forming rabbets in the rear side surfaces of the lugs across their outer ends of suitable depth to bring the head end of the coupling part 4 to compress the packing-ring 8 as the coupling parts are connected, and thereby seal the joint and cause the packing-ring to yieldingly hold said lugs 9 against the shoulders of the sockets or keepers.

The sockets or keepers 10 and 11 are conveniently incorporated by forming opposite side walls 17 integral with the wall of counterbore 7, and these walls extend slightly forward from the outer end of the counterbore and project laterally from opposite sides of the head of the respective coupling part and are arranged at suitable separation from each other to embrace the projecting end portion of the packing-ring and to receive freely the head end of coupling part 4 and the lugs 9. Between the outer ends of these side walls at one side of the coupling part is the shoulder 15, which comprises a cross-bar formed integral with said pieces adjacent their outer side edges and beveled along the inner side corner, and between the opposite ends of these side walls is the shoulder 16, which comprises a cross-bar formed integral with said sides adjacent their outer side edges and extended forwardly therefrom to form a longitudinal guide-lip 19, which is inclined inwardly along the inner side face from the base to the outer end in conformity with the sweep of the outer end of the lug 9, which rides thereupon as the coupling parts are connected, Fig. 2.

To connect the coupling parts, they are grasped in opposite hands and brought together at an obtuse angle, with one of the lugs 9 inserted in the socket or keeper 10 and the top surface of the respective stop 20 resting against the under surface of shoulder 15 and the outer end of the opposite lug 9 lying against the inclined face of the guide-lip, Fig. 2. This will cause the end of the coupling part 4 to bear upon the outer end of the packing-ring at the base of the lug 9, which is in the socket or keeper 10, and consequently the packing-ring will be compressed at this side as the coupling part 4 is pressed downwardly at the outer end to bring the opposite lug 9 to enter the socket or keeper 11, and this compression of the ring at this side will cause it to shift the coupling part 4 laterally as the end of said lug clears shoulder 16, and the stop on the opposite lug will then ride up the beveled edge of shoulder 15 and force part 4 over until the outer end portion of the opposite lug 9 engages the shoulder in the socket or keeper 11, and the pressure on the packing-ring will then be equalized.

When desired to disconnect the coupling, the coupling part 4 is simply pressed upwardly at the outer end, Fig. 2, so as to compress the packing-ring at the base of the lug 9 in the socket or keeper 10, when the stop on said lug will ride the bevel on shoulder 15, and the resiliency of the packing-ring will assist in shifting said coupling part laterally to disengage the opposite lug 9 from the socket or keeper 11.

This coupling is simple and inexpensive of construction and durable in use, and the parts can be readily connected or disconnected with but slight exertion, while the interposed resilient packing serves to yieldingly secure the coupling parts in interlocked position, and the stops on the lugs prevent lateral displacement of the parts when connected.

Having thus described my invention, what I claim as new, and desire to secure by Letters Patent, is—

1. In a coupling of the nature indicated; the combination of a pair of coupling parts, one of which is provided with opposite laterally-projecting lugs at the head end, and the other of said parts having sockets at the head end provided with opposite shoulders consisting of cross-bars arranged at less separation than the distance between the outer ends of said lugs, and the resilient body interposed between said coupling parts.

2. In a coupling of the nature indicated; the combination of a pair of coupling parts, one of which is provided with opposite laterally-projecting lugs at the head end, and the other of said parts having sockets at the head end provided with opposite shoulders consisting of cross-bars arranged at less separation than the distance between the outer ends of said lugs, a longitudinal guide-lip extending forwardly from one of said cross-bars, and a resilient body interposed between said coupling parts.

3. In a coupling of the nature indicated; the combination of a pair of tubular coupling parts, one of which is provided with opposite laterally-projecting lugs at the head end each having a rearwardly-projecting stop on the rear side surface, and the other of said parts having opposite transverse sockets at the head end, and a packing comprising an annular resilient body interposed between said coupling parts.

4. In a coupling of the nature indicated; the combination of a pair of tubular coupling parts, one of which is provided with opposite laterally-projecting lugs at the head end each having a rearwardly-projecting stop on the rear side surface, and the other of said parts having opposite transverse sockets at the head end, a longitudinal guide-lip extending forwardly from one of said sockets, and a packing comprising an annular resilient body interposed between said coupling parts.

5. In a coupling of the nature indicated; the combination of a pair of coupling parts, one of which is provided with opposite laterally-projecting lugs at the head end each having a rabbet in the outer end at the rear side, and the other of said parts having opposite transverse sockets at the head end, one of said sockets having the forward side edge of the mouth beveled, a longitudinal guide-lip extending forwardly from the opposite socket, and a packing comprising an annular resilient body interposed between said coupling parts.

6. In a coupling of the nature indicated; the combination of a pair of tubular coupling parts, one of which is provided with opposite laterally-projecting lugs at the head end, and the other of said parts having a comparatively deep counterbore in the head end and opposite transverse sockets at the outer end of said counterbore, and a packing comprising an annular resilient body seated in said counterbore and projecting beyond the outer end thereof.

7. In a coupling of the nature indicated; the combination of a pair of tubular coupling parts, one of which is provided with opposite laterally-projecting lugs at the head end each having a rearwardly-projecting stop on the rear side surface, and the other of said parts having a comparatively deep counterbore in the head end and opposite transverse sockets at the outer end of said counterbore, one of said sockets having the forward side edge of the mouth beveled, a longitudinal guide-lip extending forwardly from the opposite socket, and a packing comprising an annular resilient body seated in said counterbore and projecting beyond the outer end thereof.

8. In a coupling of the nature indicated; the combination of a pair of tubular coupling parts, one of which is provided with opposite laterally-projecting lugs at the head end each having a rearwardly-projecting stop on the rear side surface, and the other of said parts having a comparatively deep counterbore in the head end and opposite transverse side walls projecting forwardly from the outer end of said counterbore and extending laterally, a cross-bar between said walls adjacent one end beveled at the inner corner, a second cross-bar between said walls adjacent the opposite end, a forwardly-extending guide-lip at said second cross-bar, and a packing comprising an annular resilient body seated in said counterbore and projecting beyond the outer end thereof.

9. In a coupling of the nature indicated; the combination of a pair of tubular coupling parts, one of which is provided with opposite laterally-projecting lugs at the head end each having a rabbet in the outer end at the rear side, and the other of said parts having a comparatively deep counterbore in the head end and opposite transverse side walls projecting forwardly from the outer end of said counterbore and extending laterally, a cross-bar between said walls adjacent one end beveled at the inner corner, a second cross-bar between said walls adjacent the opposite end, a forwardly-extending guide-lip at said second cross-bar having the inner side face inclined inwardly from the base forwardly, and a packing comprising an annular resilient body seated in said counterbore and projecting beyond the outer end thereof.

Signed at Seattle, Washington, this 1st day of June, 1903.

JAMES ALEXANDER ALLEN.

Witnesses:
ERNEST B. HERALD,
J. TRACY SMITH.